United States Patent [19]

Gidge

[11] 3,792,839
[45] Feb. 19, 1974

[54] DEVICE FOR THE INJECTION OF FLUID FOAMING AGENTS INTO PLASTICIZED POLYMERIC MATERIAL

[75] Inventor: Lester Gidge, Nashua, N.H.

[73] Assignee: Polysar Limited, Sarnia, Ontario, Canada

[22] Filed: Aug. 23, 1971

[21] Appl. No.: 174,117

[52] U.S. Cl. ................................. 259/193, 259/4
[51] Int. Cl. ............................................. A21c 7/00
[58] Field of Search... 259/191, 192, 193, 9, 10, 97, 259/4; 264/50, 53; 425/209, 197

[56] References Cited
UNITED STATES PATENTS

| | | | |
|---|---|---|---|
| 2,595,210 | 4/1952 | Clinefelter | 259/193 |
| 2,815,532 | 12/1957 | Braunlich | 259/4 |
| 3,316,335 | 4/1967 | Snella | 264/50 |

Primary Examiner—Robert W. Jenkins
Attorney, Agent, or Firm—Cullen, Settle, Sloman & Cantor

[57] ABSTRACT

A device for introducing a fluid foaming agent into a plasticized polymeric material comprising, a conduit and a fluid permeable labyrinthian element interposed in the conduit for the passage of the plasticized polymeric material therethrough under pressure. Means for supplying fluid foaming agent to the fluid permeable element at a pressure greater than the pressure of the plasticized polymeric material so that the fluid foaming agent will flow through the element and into the plasticized polymeric material in a finely dispersed state.

3 Claims, 4 Drawing Figures

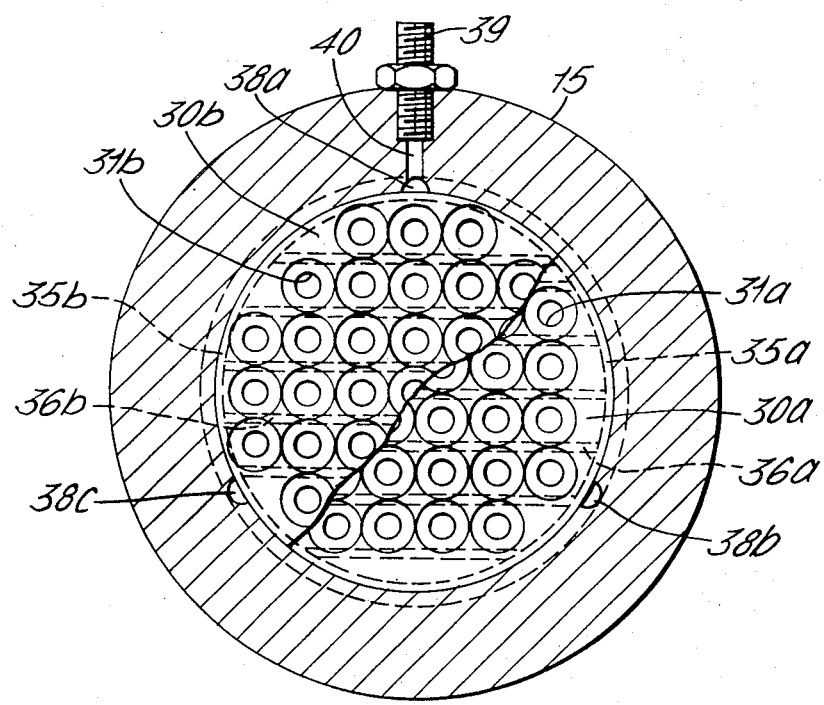

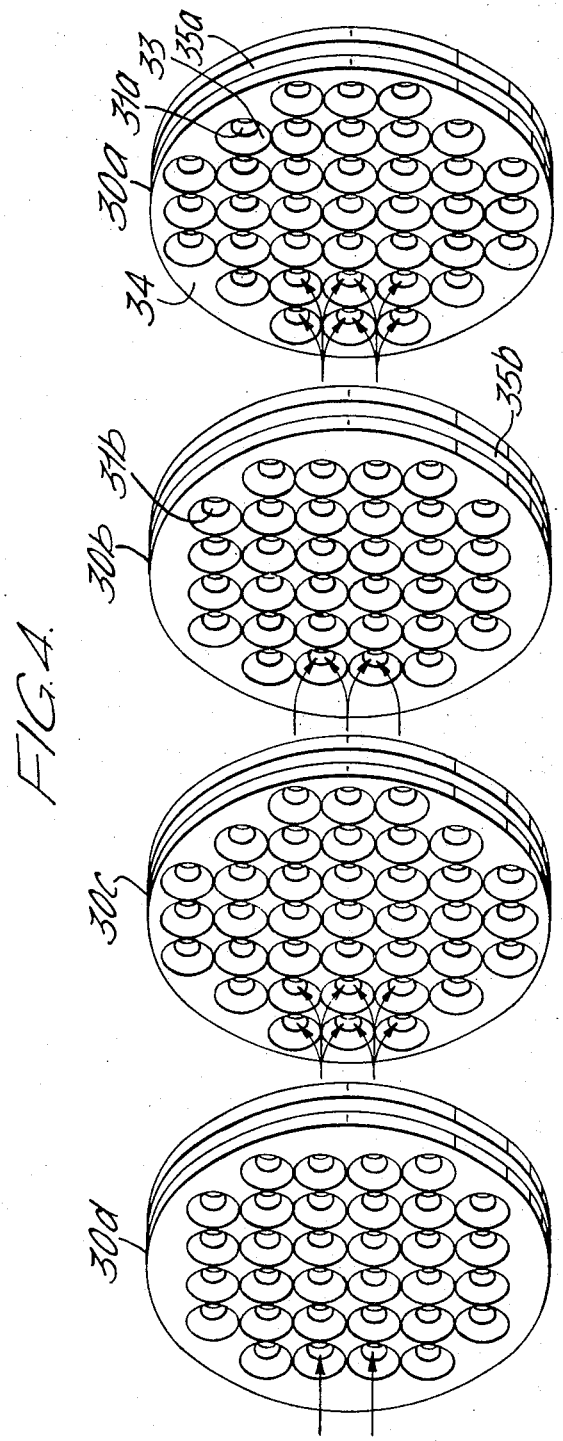

DEVICE FOR THE INJECTION OF FLUID FOAMING AGENTS INTO PLASTICIZED POLYMERIC MATERIAL

BACKGROUND OF THE INVENTION

Processes for the production of foamed plastics and the like may be divided into three main classes: mechanical, physical and chemical. Mechanical processes involve the whipping of plastic compounds and are of limited usefulness. By far the most important and widely used are the physical and chemical processes, both of which form the characteristic cellular structure by the action of "foaming agents." These foaming agents are materials which, when mixed with a plastic compound, react under given physical conditions to produce a foamed structure in the material.

Chemical foaming agents decompose under the influence of heat to yield at least one gaseous product — usually nitrogen — which produces the foaming action. There are many organic and inorganic substances which may be used, but only a few which are commercially satisfactory. One of the most commonly used in plastic forming processes is ABFA (azobisformamide). Satisfying the most important requirements of a foaming agent: decomposition temperature range, non toxicity, freedom from odour, staining, discolouration of the plastic, stability in storage etc., ABFA yields a good quality product. However, chemical foaming agents generally are expensive; They require the separate step of mixing with the plastic compound before plasticization, and close heat control throughout the process must be maintained to prevent premature foaming and also to obtain an even rate of decomposition throughout the material. The use of chemical foaming agents therefore involves high production costs and, in consequence, a more expensive product.

Physical foaming agents are materials, usually liquid or gaseous, which change their physical state during the foaming operation. For example: compressed gases expand when the pressure is released, and volatile liquids develop cells in the plastic material when they change from liquid to gas. The volatile liquid agents are presently more widely used by industry than gaseous agents. Liquid at or near ambient temperature and pressure, their boiling points are usually below 110° C at atmospheric pressure. The group includes aliphatic hydrocarbons such as pentane. Inexpensive and of low toxicity they are, nevertheless, highly flammable. Chlorinated hydrocarbons such as methyl chloride, widely used in the manufacture of foamed polystyrene, present some toxicity problems.

The use of gaseous foaming agents in direct gassing processes would appear to offer many advantages. Inert gases such as nitrogen will not degrade thermoplastic compounds in any way, they can be introduced directly into plasticized material under pressure, and require no further decomposition, they are safe to use, and are relatively cheap. Their prime disadvantage lies in the difficulty of obtaining an even distribution of the gas in minute bubbles throughout the plasticized material to produce a uniform foam structure.

Gaseous foaming agents are generally introduced into a decompression zone or zone of reduced pressure in a screw-type extruder. This zone, usually formed by reducing the root or stem diameter of the screw, may be at any point along the barrel downstream from a point where the granular feed material has become plasticized. Since the gas is usually introduced through an open port or ports in the extruder barrel, there is always the possibility of plasticized material entering and blocking these ports if the pressure differential between gas and plastic undergoes a reversal for any reason. This crude way of introducing gas into plasticized material, coupled with the fact that the screw-type extruder is not a good mixing device, results in uneven distribution of the gas in random size bubbles throughout the melt. The resulting foam structure is, therefore, not uniform in density and may contain quite large voids. In injection moulded structural foam parts, this results in weakened areas and, to some extent, a poor surface finish.

SUMMARY OF THE INVENTION

In order to overcome these primary disadvantages associated with the direct gassing process, the present invention contemplates the injection of gaseous foaming agents into plasticized material through a fluid permeable element which presents as large a diffusion surface as possible to the material stream. The fluid permeable element must, at the same time, be permeable to the gaseous (or liquid) foaming agents contemplated but impermeable to hot thermoplastic under very high pressure. It has been discovered that certain sintered materials, particularly sintered iron materials are well suited to this purpose. A particular grade of material commercially available and used in the present invention is an Iron/Nickel material containing 3.5 percent Ni and 0.75 percent C, density 7.18 grams per cc and a theoretical percentage density of 92.8 percent. Other sintered materials of densities in close proximity to this would obviously be suitable and, in possessing other physical properties, might be more suitable. Being machinable after sintering as well as mouldable before sintering, structures in many shapes and forms can be produced.

It will be readily seen that the use of such fluid permeable elements in the form of annular inserts in the walls of extruder barrels, conduits, extruder stems or heads, would be a beneficial improvement over open outlets in gas supply systems in preventing ingress of plastic material into the system under all operating and non-operating conditions. However, the present invention further contemplates the formation of a labyrinthian structure interposed in the melt stream wherein the walls of the passages therethrough contain or are substantially all diffusion surfaces. The advantages stemming from such structure are several: In an extruder, apart from evenly dispersing the gas in tiny bubbles throughout the melt, the structure also acts as a breaker plate supporting a screen pack if desired and, as such, provides a back pressure in the extruder. The bifurcated passages of the preferred embodiment serve further to mix and homogenize the melt.

A preferred embodiment of the invention to be described includes a porous element permeable to gas and non-viscous fluids but impermeable to plasticized thermoplastic material and the like, and comprising a plurality of stacked, individually perforated, sintered metal plates. The perforations of adjacent plates are offset with respect to each other to define a labyrinthian path and prevent a straight-through flow of material through the stacked plates. The stack is housed within a cylindrical housing (such as the barrel of a screw-type extruder) so that it is interposed in the melt stream and is supplied with a gaseous fluid such as nitrogen through suitable ducting. The pack is further supported axially against the compression forces of the melt stream by a structural member perforated to cooperate with an adjacent sintered metal plate. A fine-mesh screen of the type associated with a conventional breaker plate may also be used with the invention if required.

BRIEF DESCRIPTION OF THE DRAWINGS

The preferred embodiment of the invention is shown in the following drawings in which like reference characters are used to denote like parts throughout the several views and in which:

FIG. 3, is a cross-sectional view of the invention taken along the line 3—3 in FIG. 2, and with part of one of the perforated plates cut away to show the relationship of hole patterns in adjacent plates; and FIG. 4, is an exploded view of the stack of perforate plates constituting the porous element.

DESCRIPTION OF THE PREFERRED EMBODIMENT

Figure 1:
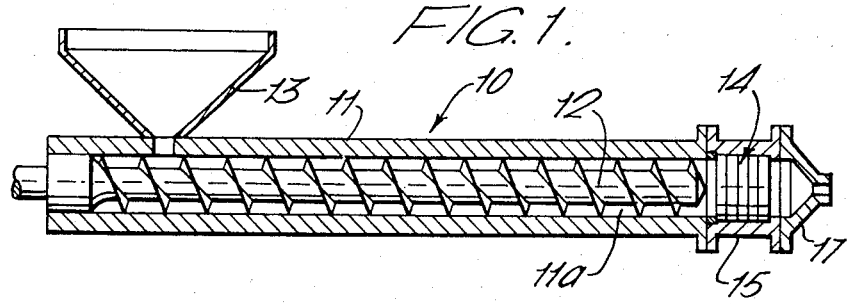
FIG. 1, is a diagrammatic illustration of an extrusion machine showing the location of the invention.

Referring more particularly to FIG. 1, a single screw, extrusion machine is generally indicated at 10 having a barrel 11, a bore 11a, and a flighted screw 12 for rotation within the barrel by a prime mover (not shown). A hopper 13 at one end of the barrel feeds granular plastic material to the screw 12. At the delivery end of the barrel 11 a porous element of the invention generally indicated at 14 is housed in a short cylindrical housing 15 attached to the barrel by any well-known means such as split C-ring clamps 16 (see FIG. 2) so as to be substantially an extension of the barrel. A nozzle 17 is similarly attached to the delivery end of housing 15. A screen pack (not shown) such as is often associated with a conventional breaker plate in extruders may be placed ahead or upstream of the porous element if desired. Whether a screen pack is provided or not, the porous element with its labyrinthian paths for the passage of plasticized material therethrough creates sufficient resistance to provide a back-pressure in the melt against which the screw can work, plasticize and homogenize the material.

Now referring more particularly to the remaining Figures, it will be seen that housing 15 is spigotted at 18 to the delivery end of extruder barrel 11 which is shown in part. The housing is provided with a bore 19 equal to or slightly larger than bore 11a of the extruder. A counterbore 20 in the main portion of the housing 15 forms a narrow shoulder 21 with bore 19 and a screw-threaded counterbore 22 is adapted to receive a ring-nut 23 to be described later.

Supported within the counterbore 20 and bearing against shoulder 21 is a perforated, disc-shaped support plate 24 which is a structurally strong member made from a material such as high tensile steel. The prime function of plate 24 is to support the porous element 14 against the compressive force of the plastic material in the extruder. Plate 24 is perforated in a regular grid pattern by perforations 25 on pitch centres 2D apart, where D is the diameter of a perforation. An upstream face 26 of the plate is plain; the perforations are countersunk as at 27 in a downstream face 28 of the plate. Countersinks 27 are of such a size that there is a point of contiguity between adjacent countersinks. This promotes good outflow characteristics from the perforations and reduces the size of dead spots which would otherwise cause a hang up of plasticized material which would ultimately degrade then break away and pollute fresh flowing material.

Abutting plate 24 in counterbore 20 is a stack of four porous diffusion plates designated 30a, 30b, 30c and 30d of sintered iron/nickel material, so designated according to their order of assembly in housing 15. Diffusion plate 30a is provided with perforations 31a co-extensive with perforations 25 in support plate 24. A plain downstream face 32 (FIG. 2) of the plate abuts face 26 of plate 24. The perforations 31a have countersinks 33 in an upstream face 34 of the plate to provide a good inflow for the plastic, reduce the size of dead spots between the perforations and, more importantly, to provide the labyrinthian paths through the porous element as will be described later herein. A continuous "U" shaped channel 35a is formed in the peripheral edge of plate 30a and a series of ducts 36a (see FIGS. 2 and 3) extends transversely through the disc between consecutive rows of perforations 31a with each duct beginning and terminating in channel 35. The purpose of ducts is to ensure a supply of gas or fluid foaming agent to the central area of the diffusion plate. Although shown running parallel in one direction only, it may be desirable to have a second series running normal to and interlinking the first series for even better distribution of fluid within the plate.

Diffusion plate 30b is placed ahead or upstream of plate 30a. Precisely similar in size to plate 30a, plate 30b is also provided with a similar peripheral channel 35b and transverse ducts 36b. Perforations 31b are countersunk on both faces of the plate, again to the point of contiguity. However the prime difference between plates 30a and 30b lies in the positional relationship between their respective grid patterns. This relationship will be quite clearly understood by reference to FIG. 3, where it will be seen that the centres of perforations 31b are offset one half of the pitch in both horizontal and vertical directions with respect to perforations 31a.

Diffusion plates 30a and 30b together form a sub-unit of porous element 14. That is to say, they satisfy the secondary function of the invention which is to divide and re-combine discrete streams of material for greater homogenization of the plastics material and breakdown of the entrained gas bubbles as will be described under the section "In Operation". Porous element 14 in the preferred embodiment utilizes two sub-units wherein diffusion plate 30c has a similar perforation pattern to plate 30a and plate 30d has a similar pattern of perforations to 30b. It will be realized that since there are but two perforation patterns, any number of individual diffusion plates used alternately may comprise a complete element according to the invention. To prevent leakage, diffusion plate surfaces are ground and lapped flat. In addition, it may be desirable to silver-solder or braze the plates together to further prevent leakage between them and into the gas system, since the pressures in the plastic material may be in the region of 5000 p.s.i. The porous element 14 is retained in the counterbore 20 by ring nut 23 in a well known manner.

A series of four annular channels 37 is machined in counterbore 20, each channel 37 cooperating with a peripheral channel such as 35a in diffusion plate 30a of each of the diffusion plates of the porous element. Channels 37 are interconnected by three axially directed channels 38a, 38b and 38c which are angularly disposed around the counterbore 20. A threaded pipe union 39 set in housing 15 communicates through duct 40 with axial channel 38a. Exteriorly of the housing 15, pipe union 39 is connected to a pressurized source of fluid foaming agent (not shown) but which in the preferred case is gaseous nitrogen.

In its function as a means for injecting gaseous foaming agent into plasticized material, gas (in the present case nitrogen) at a pressure which is greater than the pressure of the material itself is received at union 39 from an outside source. The gas passes into housing 15 along duct 40 to 38a and from thence to channels 37 with channels 38b and 38c ensuring equal distribution thereto. Each annular channel 37 registers individually with a peripheral edge channel, such as 35a, in each diffusion plate 30a, 30b, 30c and 30d. Gas is therefore delivered to each series of transverse ducts, such as 36a, in each diffusion plate and permeates the sintered material from which they are made. The labyrinthian passages formed by the perforations and their countersinks through which the plastic material is caused to pass are defined entirely by diffusion surfaces from which the gas continuously exudes under pressure.

Figure 2:
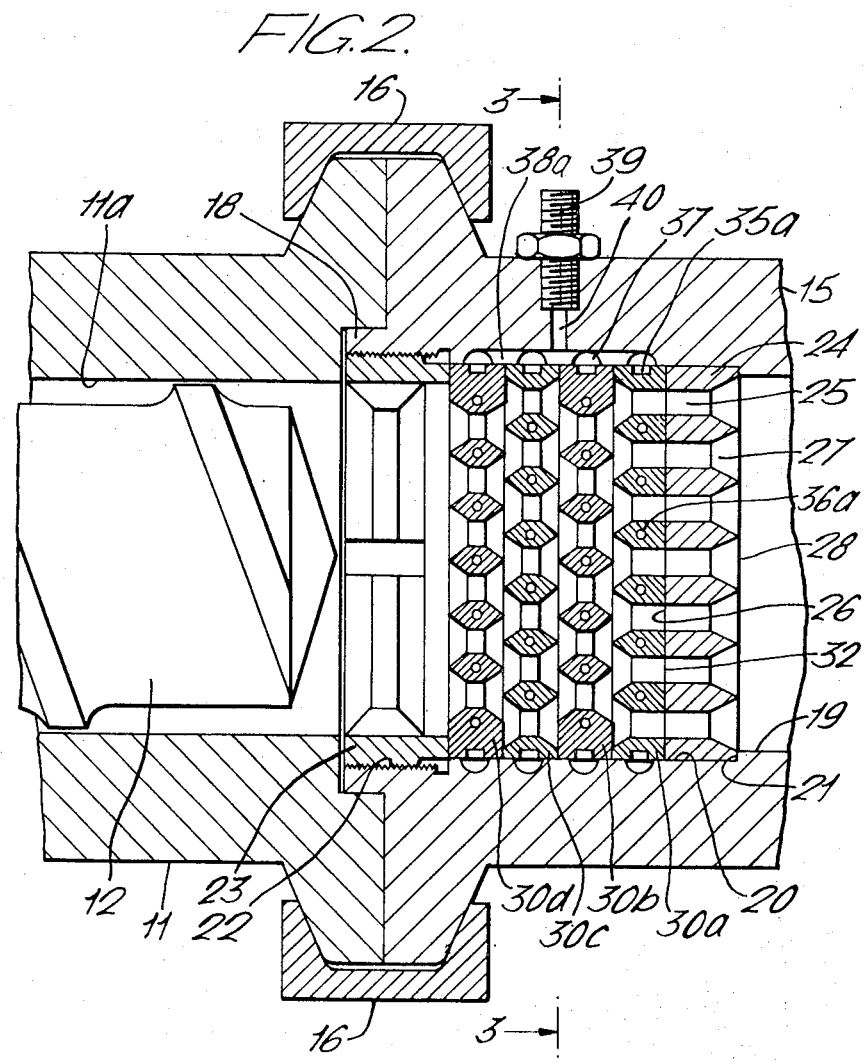
FIG. 2, is a detailed side elevation, in section, of the portion of the extruder including the invention shown in FIG. 1.

A full understanding of the paths followed by the plastic material through the porous element will be gained by first referring to FIG. 2. Plastic material passes from the extruder barrel 11 through the ring nut 23 and enters the perforations of plate 30d. By virtue of the offsetting of the perforations and countersinks in plate 30c, the material streams divide as they pass through the perforations in plate 30c. Re-combining to pass through plate 30b they divide again through plate 30a. However, it must be remembered that the perforations in successive plates are offset in two mutually perpendicular directions. In following the paths of material through given perforations as indicated by the arrows in FIG. 4, it will be realized that except at peripherally disposed perforations the division at intermediate stages is fourfold.

Each division and re-combination of discrete streams of plastic effectively mixes and homogenizes the material a little further at each stage. Since all the internal surfaces contacted by the plastic in its passage through element 14 are diffusion surfaces exuding minute bubbles of gas, the gas is finely dispersed throughout the material which finally re-combines into one stream on passing through the perforations of support plate 24 into bore 19.

Although the foregoing invention has been described in some detail by way of illustration and example for the purposes of clarity and understanding, it is understood that certain changes and modifications may be made within the spirit of the invention and scope of the appended claims.

What is claimed is:

1. A device for the injection of a fluid foaming agent into a plasticized polymeric material comprising
a housing defining an axially elongated conduit for the passage of said polymeric material therethrough, at least two diffusion plates fixed in the conduit to extend substantially normal to the axis of the conduit, said two plates including a first diffusion plate of sintered material having axial perforations therethrough arranged in a grid pattern, and internal fluid distribution ducts within the plate and communicating with the periphery of the plate,
and a second diffusion plate of sintered material having axial perforations therethrough arranged in a grid pattern which is offset with respect to the grid pattern of said first diffusion plate, said second diffusion plate also having internal fluid distribution ducts communicating with the periphery of said second diffusion plate,
and supply means for conducting said fluid through said housing into communication with the peripheries of the diffusion plates.

2. A device for the injection of a fluid foaming agent into a plasticized polymeric material comprising a housing defining an axially elongated conduit for the passage of said plasticized polymeric material therethrough,
a plurality of axially abutting diffusion plates extending across the conduit to lie substantially normal to the axis of the conduit, each of said diffusion plates having axial perforations therethrough arranged in grid patterns, the grid patterns of axially adjacent plates being offset relative to one another to define an overall labyrinth flow path through the plates, said plates each having a peripheral flow passage and transverse fluid distribution ducts communicating with the peripheral flow passage and extending across the transverse extent of the plate intermediate the perforations therein, and
means for supplying said fluid foaming agent to the peripheral flow passages of said plates.

3. A device for injection of a fluid foaming agent into a plasticized polymeric material comprising
a housing defining a conduit for the passage of said polymeric material therethrough,
a structurally strong perforate support plate traversing the conduit in fixed relation therewith wherein the perforations are in a grid pattern of regular pitch;
a porous element in the conduit in series with the said support plate comprising,
a first diffusion plate of sintered material having perforations coextensive with the perforations in said support plate wherein said perforations are countersunk to a point of contiguity in a surface remote from the wall support plate and having fluid distribution ducts within the plate, and
a second diffusion plate of sintered material having perforations on a grid pattern which is offset one-half pitch with respect to the grid pattern of said first plate wherein said perforations are countersunk to a point of contiguity in both surfaces of the plate and having fluid distribution ducts within the plate;
means for retaining the said porous element within the conduit, and
supply means for the distribution of said fluid peripherally within the housing to the porous element.

* * * * *